(12) United States Patent
Wong et al.

(10) Patent No.: US 7,765,824 B2
(45) Date of Patent: Aug. 3, 2010

(54) VEHICLE INTERIOR COOLING SYSTEM

(75) Inventors: Alec C. Wong, Bellevue, WA (US);
Robert Preston Feight, Duvall, WA (US); John D. Duffy, Seattle, WA (US); Gregory S. Hall, Bothell, WA (US)

(73) Assignee: PACCAR Inc, Bellevue, WA (US)

( * ) Notice: Subject to any disclaimer, the term of this patent is extended or adjusted under 35 U.S.C. 154(b) by 217 days.

(21) Appl. No.: 11/344,965

(22) Filed: Feb. 1, 2006

(65) Prior Publication Data
US 2007/0175230 A1   Aug. 2, 2007

(51) Int. Cl.
*B60H 1/32* (2006.01)
(52) U.S. Cl. .............................. 62/239; 62/236; 62/244; 62/434; 62/435; 62/133; 62/430; 62/181; 62/183
(58) Field of Classification Search .................. 62/239, 62/244, 434–435, 236, 133, 44, 430, 181, 62/183
See application file for complete search history.

(56) References Cited

U.S. PATENT DOCUMENTS

| | | | |
|---|---|---|---|
| 2,162,512 A | 6/1939 | McPherson | |
| 2,443,472 A | 6/1948 | Mayo | |
| 2,794,330 A | 6/1957 | Dunn | |
| 2,867,992 A | 1/1959 | McGuffey | |
| 2,895,310 A | 7/1959 | Benisch | |
| 2,922,293 A | 1/1960 | Peix | |
| 3,163,995 A | 1/1965 | Maier | |
| 3,381,492 A | 5/1968 | Dixon | |
| 3,381,493 A | 5/1968 | Dixon | |
| 3,715,001 A | 2/1973 | Wilson | |
| 3,885,398 A | 5/1975 | Dawkins | |
| 3,929,202 A | 12/1975 | Hobbensiefken | |
| 3,984,224 A | 10/1976 | Dawkins | |
| 4,015,962 A * | 4/1977 | Tompkins | 62/175 |
| 4,051,691 A | 10/1977 | Dawkins | |
| 4,151,959 A * | 5/1979 | Deister | 241/69 |
| 4,567,734 A | 2/1986 | Dankowski | |
| 5,205,130 A * | 4/1993 | Pannell | 62/236 |
| 5,317,880 A * | 6/1994 | Spears | 62/239 |
| 5,341,652 A * | 8/1994 | Tajiri et al. | 62/244 |
| 5,373,892 A | 12/1994 | Johnson | |

(Continued)

FOREIGN PATENT DOCUMENTS

EP          257569 A1 *   3/1988

*Primary Examiner*—Frantz F. Jules
*Assistant Examiner*—Azim Rahim
(74) *Attorney, Agent, or Firm*—Christiansen O'Connor Johnson Kindness PLLC (57) ABSTRACT

A vehicle interior cooling system (200) for a vehicle having a cabin (208) and an engine (207) for providing propulsion power generally includes a first cabin cooling system (202) driven by the engine of the vehicle having a first condenser (214). The vehicle interior cooling system also generally includes a second cabin cooling system (203) driven by electrical power having a cold storage device (210) and a second condenser (232), with the first condenser and the second condenser being in an airflow line (260). The second cabin cooling system selectively thermally charges the cold storage device when the engine is in an on position. The second cabin cooling system is also selectable to thermally cool the cabin when the engine is in an off position and selectable to thermally cool the cabin when the engine is in the on position.

8 Claims, 6 Drawing Sheets

U.S. PATENT DOCUMENTS

| | | |
|---|---|---|
| 5,878,592 A | 3/1999 | Borges |
| 5,901,572 A * | 5/1999 | Peiffer et al. .................. 62/480 |
| 6,016,662 A * | 1/2000 | Tanaka et al. ................. 62/199 |
| 6,453,678 B1 * | 9/2002 | Sundhar ....................... 62/3.2 |
| 6,932,148 B1 * | 8/2005 | Brummett et al. ............. 165/43 |
| 7,043,931 B2 * | 5/2006 | Plummer ..................... 62/236 |
| 7,237,397 B2 * | 7/2007 | Allen ......................... 62/236 |
| 7,290,400 B2 * | 11/2007 | Heberle et al. ................ 62/183 |
| 7,316,119 B2 * | 1/2008 | Allen ......................... 62/236 |
| 2001/0027660 A1 | 10/2001 | Moffa |
| 2001/0035020 A1 * | 11/2001 | Gehman et al. ............... 62/244 |
| 2003/0192952 A1 * | 10/2003 | Horn et al. .................... 236/10 |
| 2003/0233835 A1 * | 12/2003 | Tomita et al. ................. 62/133 |
| 2004/0060312 A1 * | 4/2004 | Horn et al. .................... 62/244 |
| 2004/0123976 A1 * | 7/2004 | Horn et al. .................... 165/42 |
| 2005/0087333 A1 * | 4/2005 | Horn et al. .................. 165/203 |
| 2005/0210903 A1 * | 9/2005 | Allen ......................... 62/244 |
| 2006/0021366 A1 * | 2/2006 | Plummer ..................... 62/236 |
| 2006/0042286 A1 * | 3/2006 | Heberle et al. ................ 62/239 |
| 2006/0130505 A1 * | 6/2006 | Plummer ..................... 62/236 |
| 2007/0120397 A1 * | 5/2007 | Layfield et al. ........... 296/180.4 |

* cited by examiner

VEHICLE INTERIOR COOLING SYSTEM

TECHNICAL FIELD

The present disclosure relates generally to vehicle interior cooling systems, and more particularly to vehicle interior cooling systems utilizing a cold storage device.

BACKGROUND

Keeping the interior of a vehicle at a comfortable temperature is an important aspect of providing driver comfort and safety. In some cases, it is also desirable to maintain the interior at a comfortable temperature while the vehicle is parked. Most notably, long-haul truckers often sleep in the cab of the truck during the required 10-hour rest period.

One way of keeping the cab of the truck cool when the truck is parked is to maintain the engine at an idle and run the truck's main air conditioning system. However, this long-term idling results in increased fuel consumption, pollution, engine maintenance, and reduced battery life. Further exasperating the problem is that the truck's engine must be run at a higher RPM than idle to produce enough current to support auxiliary sleeper air conditioning. Thus, if the RPM of the engine is not increased above idle, the batteries will operate in deficit.

As a result of the environmental considerations discussed above, federal regulations will soon require maintaining interior cab temperatures of a Class 8 vehicle in an engine off (or "no-idle") condition. To maintain driver comfort, many Class 8 vehicles have been equipped with two air conditioning systems: a first system for use when the engine of the truck is running, and a second system for use when the truck is parked and the engine is off. Thus, there exists a need for optimizing vehicle air conditioning systems, particularly for optimizing the fuel efficiency of Class 8 vehicles having two air conditioning systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a vehicle interior cooling system for a vehicle having a cabin and an engine for providing propulsion power is provided. The vehicle interior cooling system includes a first cabin cooling system driven by the engine of the vehicle having a first condenser. The vehicle interior cooling system further includes a second cabin cooling system driven by electrical power having a cold storage device and a second condenser, wherein the first condenser and the second condenser are in an airflow line. The second cabin cooling system selectively thermally charges the cold storage device when the engine is in an on position. The second cabin cooling system is also selectable to thermally cool the cabin when the engine is in an off position and selectable to thermally cool the cabin when the engine is in the on position.

In accordance with other embodiments of the present disclosure, the electrically driven cooling system selectively thermally charges the cold storage device when the engine is in an on position and simultaneously selectively cools the cabin to supplement the cabin cooling system.

In accordance with yet other embodiments of the present disclosure, the second cabin cooling system being selectable to thermally charge the cold storage device when the engine is in an off position and being selectable to thermally charge the cold storage device and simultaneously cool the cabin when the engine of the vehicle is in the off position. In addition, the second cabin cooling system is thermally independent of the first cooling system.

In accordance with yet other embodiments of the present disclosure, the cold storage device is thermally chargeable and dischargeable by the second cabin cooling system for cooling the interior space of the vehicle. The second cabin cooling system simultaneously thermally charges the cold storage device and supplements the first cabin cooling system in cooling the interior space of the vehicle when the engine is in the on position.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
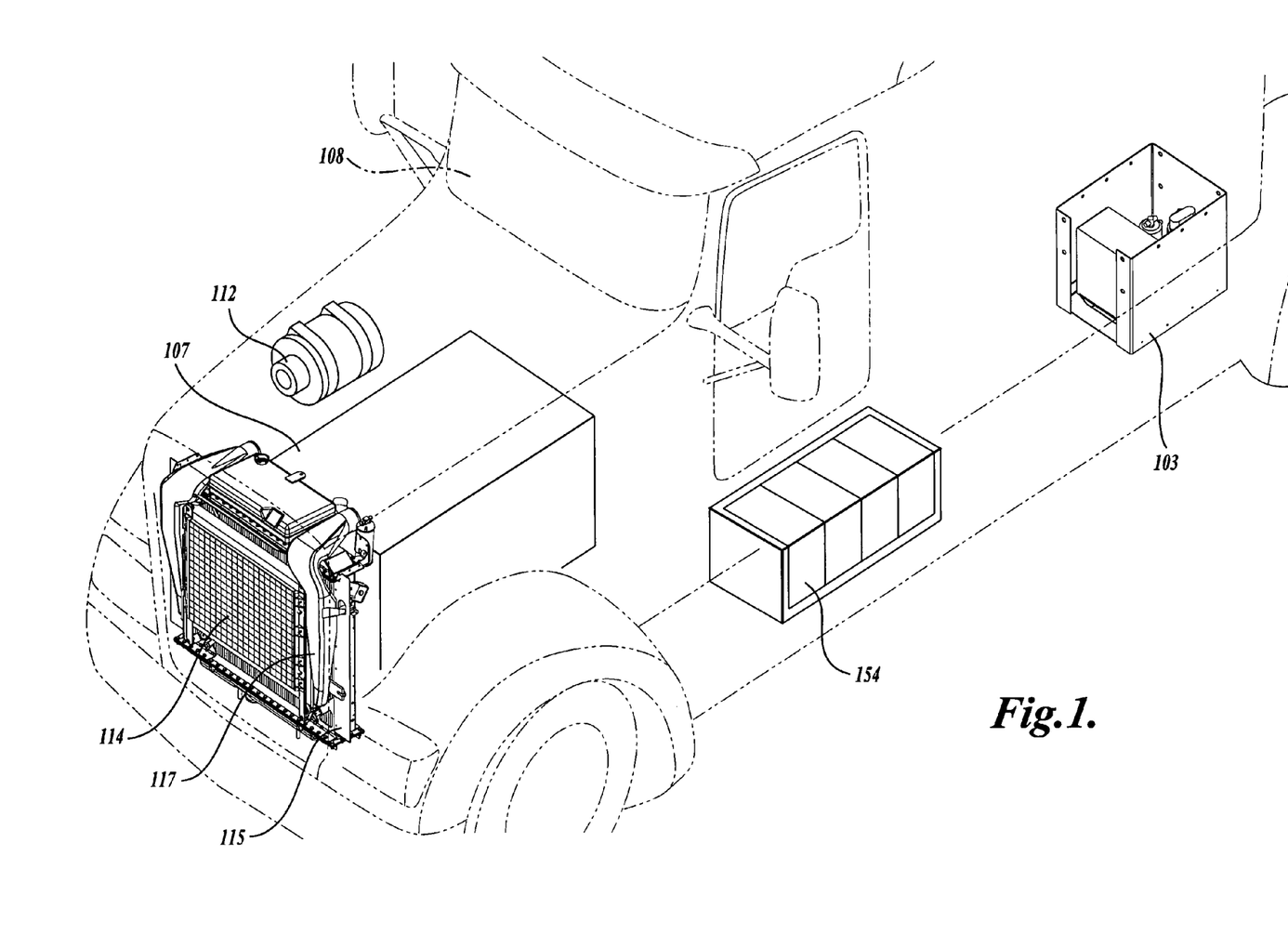
FIG. 1 is a perspective view of the forward portion of a truck, illustrating a vehicle cooling system having a main cooling system and a cold storage cooling system.
Figure 2:
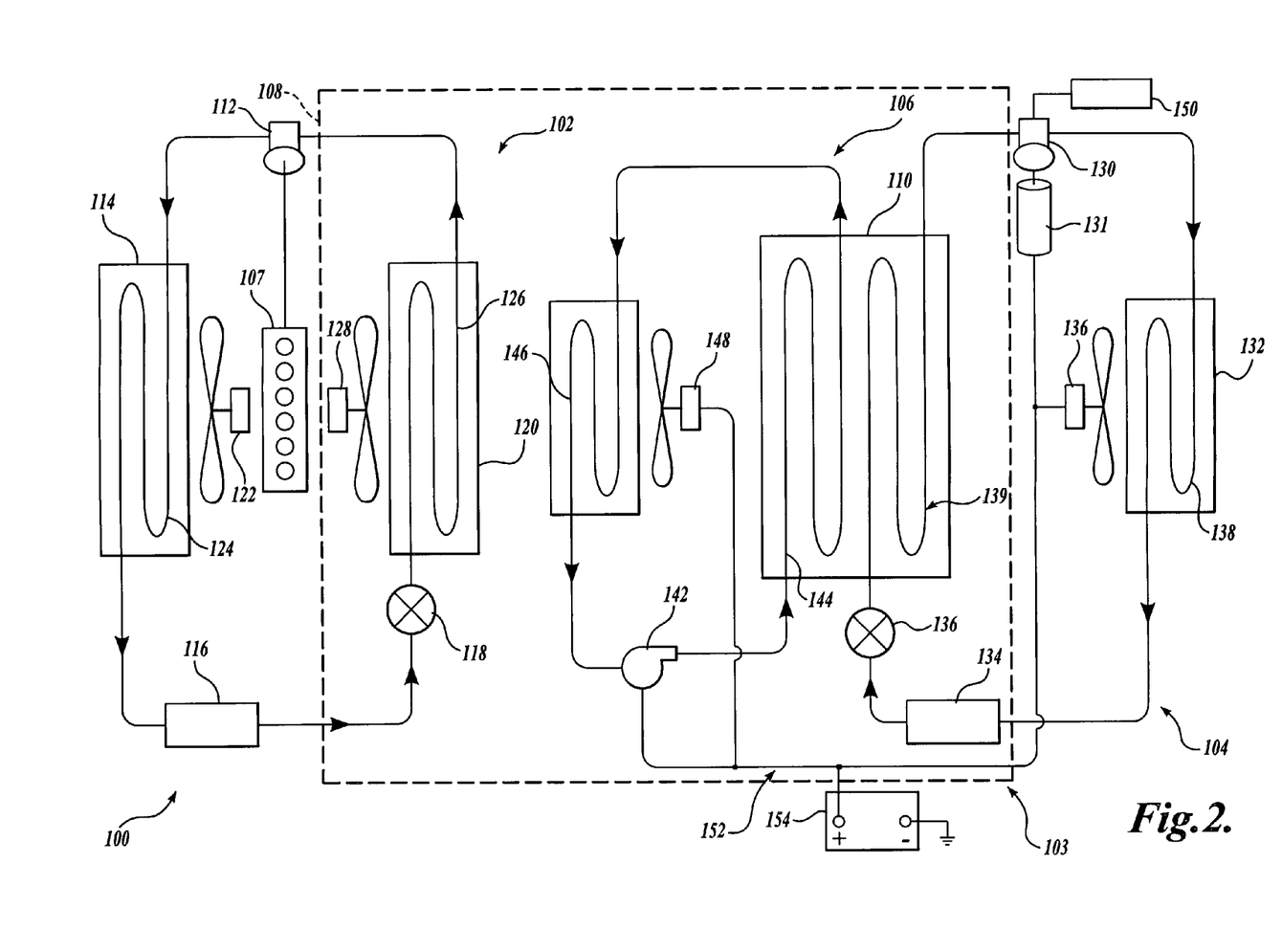
FIG. 2 is a schematic of the vehicle cooling system of FIG. 1.

FIGS. 1 and 2 illustrate a vehicle cooling system 100 having a first or main cooling system 102 and a second or cold storage cooling system 103. Although the embodiments of the present disclosure will be described as implemented with regard to a cab of a Class 8 truck, one skilled in the relevant art will appreciate that the disclosed vehicle cooling system 100 is illustrative in nature and should not be construed as limited to the application of cooling a cab of a Class 8 truck. It should therefore be apparent that the vehicle cooling system 100 described herein has wide application, and can be used for cooling a space when a drive source for the space's regular air conditioning system is running and when the drive source is off.

For purposes of this detailed description, the vehicle cooling system 100 of FIGS. 1 and 2 is divided into two subassemblies: the first or main cooling system 102 and the second or cold storage cooling system 103. Both sub-assemblies are adapted to cool a cab 108 of the truck. In general, the main cooling system 102 is the air conditioning system that is used to cool the cab 108 of the truck while an engine 107 of the truck is running. In general, the cold storage cooling system 103 is used to cool the cab 108 of the truck while the engine 107 of the truck is off. However, as described in detail below, the cold storage cooling system 103 may also be used to cool the cab 108 while the engine 107 is running.

The cold storage cooling system 103 includes a cold storage charging system 104; a heat transfer (i.e., cooling) system 106; and a cold storage device 110, to which both the cold storage charging system 104 and the heat transfer system 106 are connected. The cold storage charging system 104 is used to cold charge the cold storage device 110 while the engine 107 is running. As described in detail below, the cold charging system 104 may also be used to recharge the cold storage device 110 while the engine 107 is off (with or without shore power being provided).

The heat transfer system 106 of the cold storage cooling system 103 is used to transfer low thermal energy stored in the cold storage device 110 to the cab 108 of the truck when the engine 107 is off. Thus, the cold storage cooling system 103 of the present disclosure provides a heat transfer system 106, which is separate and distinct from the main cooling system 102. This separate and distinct cold storage cooling system 103 not only reduces the cooling load of the main cooling system 102 when the engine 107 is running, but also permits cooling of the cab 108 and recharging of the cold storage device 110 when the engine 107 is off, as discussed in detail below.

The main cooling system 102 will now be discussed in greater detail. The main cooling system 102 contains well-known components arranged in accordance with standard practices in the art of cooling system design and manufacture. With reference to the schematic in FIG. 2, these components include a first compressor 112, a first condenser 114, a first receiver 116, a first expansion valve 118, and an evaporator 120 having a set of evaporator coils 126.

During use, the compressor 112 is driven by the engine 107 of the truck by any number of suitable methods, such as by a belt and pulley system. The first compressor 112 compresses a refrigerant (such as a 42° F. coolant), producing a hot, high pressure refrigerant at the outlet of the first compressor 112. The hot gas refrigerant is then run through the heat exchange coils of the first condenser 114 so it can dissipate heat and condense into liquid refrigerant. The first condenser 114 is generally arranged such that relatively cool air (typically ambient air) is driven (such as by engine cooling fan 122) over a set of heat exchange coils 124. In this regard, and as discussed in detail below, the first condenser 114 is generally located at the front end of the truck. As the cool air passes over the heat exchange coils 124, heat is removed from the refrigerant, causing the refrigerant to condense into a liquid, which is accumulated in the first receiver 116.

From the first receiver 116, the first expansion valve 118 flashes the liquid refrigerant into a low pressure, low temperature gas and/or liquid mixture. The low pressure, low temperature refrigerant is passed through the first evaporator 120 via a set of heat exchange coils 126 disposed in heat exchange communication with the interior air of the cab 108. A fan 128 directs air to pass over the heat exchange coils 126, thereby causing heat to be transferred from the air to the refrigerant. Such heat transfer cools the air and heats the refrigerant, converting the refrigerant into a low pressure, hot gas. The cooled air is directed into the cab 108 of the vehicle to cool the cab 108. The refrigerant, as a low pressure, hot gas, is directed from the outlet of the first evaporator 120 to the inlet of the first compressor 112, where the cycle is started anew.

Referring to FIG. 1, a standard truck cooling system generally includes: a condenser 114 (which is part of the main cabin cooling system 102), a charge air cooler 115 (which is part of the engine cooling system and improves engine combustion efficiency), and a radiator 117 (which is also part of the engine cooling system), stacked in series at the front end of the truck and powered by the engine 107 of the truck. Because the condenser 114 is designed to radiate heat, the condenser 114 must have good surrounding airflow when the system is in operation to dissipate heat by convection. In the vehicle cooling system 100 of FIGS. 1 and 2, such airflow is accomplished by taking advantage of the existing engine cooling fan 122. Therefore, the high-horsepower (e.g., 30-40 horsepower) engine cooling fan 122 turns on not only when the engine 107 heats up to a certain temperature, but also during operation of the main cooling system 102.

Although a particular main cooling system 102 is depicted and described in FIGS. 1 and 2, it should be apparent to those skilled in the art that many other cooling system designs and types are suitable for use with and are within the spirit and scope of the present disclosure.

Still referring to FIGS. 1 and 2, the cold storage cooling system 103 will now be described in detail. In that regard, the cold storage charging system 104 of the cold storage cooling system 103, like the main cooling system 102, includes a second (electrically-driven) compressor 130, a second condenser 132, a second receiver 134, a second expansion valve 136, and a cold storage device 110 having a set of evaporator coils 139. The second compressor 130 is preferably connected to the vehicle electrical system 152 and driven by an electric motor 131. When the engine 107 is running, the second compressor 130 may be driven by electricity provided by an engine-driven alternator (not shown). When the engine 107 is off, the second compressor 130 may be driven by electricity provided by batteries 154 (or shore power, not shown).

During use, the cold storage charging system 104 operates in a similar manner as the main cooling system 102. The second compressor 130 compresses a gaseous refrigerant (such as a low temperature, e.g., 26° F., coolant), forming a hot, high pressure refrigerant at the outlet of the second compressor 130. The refrigerant is moved through the second condenser 132, wherein relatively cool air (typically, ambient air) is driven (such as by a low horsepower fan 136) over a set of heat exchange coils 138 of the second condenser 132. As the cool air passes over the coils 138, heat is removed from the refrigerant, causing the refrigerant to condense into a liquid, which is accumulated in the second receiver 134. The low horsepower fan 136 may, for example, be a 5 horsepower fan.

The second expansion valve 136 flashes the liquid refrigerant into a low pressure, low temperature gas and/or liquid mixture. The low pressure, low temperature refrigerant is passed through the set of evaporator coils 139 set within the cold storage device 110. As the gas is passed through the evaporator coils 139, heat is transferred from a phase change material (such as water) contained within the cold storage device 110 to the low pressure, low temperature refrigerant. Such heat transfer cools the phase change material and converts the refrigerant into a superheated gas. The low pressure, superheated gas is compressed by the compressor 130, and the cycle begins anew.

The heat transfer system 106 of the cold storage cooling system 103 includes an electrically driven pump 142, a first set of heat exchange coils 144 disposed within the cold storage device 110, and a second set of heat exchange coils 146 in heat exchange communication with the interior air of the cab 108.

During use, the electrically driven pump 142 drives a heat transfer fluid, such as antifreeze-infused water, through the first set of heat exchange coils 144 disposed within the cold storage device 110. As the heat transfer fluid passes through the coils 144, heat is transferred from the heat transfer fluid to the phase change material contained within the cold storage device 110, thereby cooling the heat transfer fluid and heating the phase change material.

The cooled heat transfer fluid is then passed through the second set of heat exchange coils 146. A fan 148 drives air over the second set of heat exchange coils 146 and into the cab 108 to cool the interior air of the cab 108. In that regard, as airflow from fan 148 passes over the coils 146, heat is transferred from the air into the heat transfer fluid, thereby heating the heat transfer fluid and cooling the air. Preferably, cooled air is directed toward the headboard end of a driver bunk (not shown), and interior air to be cooled is drawn from the foot of the driver bunk (not shown). The heat transfer system 106 continues in a cyclic pattern, thereby transferring the low thermal energy stored in the cold storage device 110 to the interior air of the cab 108.

In light of the above description of the components and individual operation of the main cooling system 102, the cold storage charging system 104, and the heat transfer system 106, the operation of these system relative to one another will now be described. Operation of the vehicle cooling system 100 may be divided into two distinct modes: a first mode when the engine 107 of the truck is running, and a second mode when the engine 107 of the truck is off. The operation of the vehicle cooling system 100 when the engine 107 of the truck is running, such as when a driver is driving the truck, will first be described.

When the engine 107 is running, the main cooling system 102 is selectively operative to maintain the interior air of the cab at a predetermined comfortable temperature or within a selected range of temperatures. The cold storage charging system 104 is also selectively operative while the engine is running and is powered by electricity generated by the alternator (not shown) coupled to the engine 107. The cold storage charging system 104 cold charges the phase change material contained within the cold storage device 110 via an electrically driven compressor, preferably converting the phase change material from a liquid to a solid.

Inasmuch as the cooling load of the cold storage device 110 is borne by a separate system (i.e., the cold storage charging system 104), the cooling load of the main cooling system 102 is reduced because it is only required to cool the cab 108, and not the cab 108 and the cold storage device 110. Thus, because the cooling load of the main cooling system 102 has been reduced, less expensive, lighter, and lower capacity components can be used in the main cooling system 102.

Further, inasmuch as the cooling load of the cold storage device 110 is borne by a separate system, there is no lag time when initiating cold charging of the cold storage device 110, as was the case with previously-developed vehicle cooling systems. More specifically, in previously developed cooling systems, a single compressor was used to provide both low temperature coolant (such as a 26° F. coolant) to cold charge the cold storage device and higher temperature coolant (such as a 42° F. coolant) to provide cabin cooling. To provide both a low and high temperature coolant, the compressor of the main cooling system was reconfigured between a high pressure mode and a low pressure mode to provide a reduced temperature coolant for cold charging the cold storage device 110 and an elevated temperature coolant for cabin cooling. As the system was toggled between the high and low pressure modes of operation, a lag time existed.

Of note, when the engine 107 is running at an idle, the engine 107, or more specifically, an alternator (not shown) coupled to the engine 107, may not produce enough electricity to power the cold storage charging system 104, necessitating the drawing of current from the batteries 154 of the vehicle. Thus, a control system 150 may be used to automatically shut down the electrical compressor 130 of the cold storage charging system 104 when a select condition is present. As non-limiting examples, select conditions may include the RPM of the vehicle falling below a predetermined RPM (for instance when the engine is idling), and the voltage of the batteries of the vehicle falling below a predetermined voltage, such as 12.5 volts. Such a control system impedes the batteries 154 of the vehicle from over depleting.

The heat transfer system 106 of the cold storage cooling system 103 is preferably not run while the engine 107 is running, as the main cooling system 102 preferably provides sufficient cooling capacity to handle the cooling load of the cab 108. However, in certain instances, the heat transfer system 106 (and preferably also the cold storage charging system 104) can be run simultaneously with the main cooling system 102. For example, running the heat transfer system 106 and the cold storage charging system 104 simultaneously with the main cooling system 102 is especially beneficial in handling peak loads such as during the initial drawing down of the cab temperature. In this mode of operation, the heat transfer system 106 thus supplements the main cooling system 102 to provide increased cooling capacity.

When the heat transfer system 106 and the cold storage charging system 104 are run simultaneously with the main cooling system 102, the heat transfer system 106 can be preferably run at a reduced capacity, such that the cold storage charging system 104 is still able to cold charge the cold storage device 110. In other words, the heat transfer system 106 can be run at a reduced capacity such that more heat is removed from the cold storage device 110 than transferred into the cold storage device 110. In this mode of operation, the phase change material in the cold storage device 110 can still undergo its phase change (i.e., its conversion from a liquid to a solid) in a reasonable amount of time.

The operation of the vehicle cooling system 100 when the engine 107 is off, such as when a driver is sleeping in the cab 108, will now be described. Because the engine 107 is off, the engine driven compressor 112 of the main cooling system 102 cannot be run, and therefore the main cooling system 102 is non-operational. Even if one were to attempt to drive the compressor from a separate electrically-driven drive motor, the current required to run the compressor of the main cooling system 102 (which is sized sufficiently large to handle a maximum cooling load of the cab) would drain the truck's batteries 154 in a short amount of time, making such a configuration impractical. For instance, a typical compressor of the size required to draw down the entire cab typically requires approximately 7 horsepower to run at full capacity, which, on a 12 volt system, would draw approximately 435 amps. Such a large draw would drain a truck battery in a very short period.

As a result, cooling of the cab 108 is provided by the cold storage cooling system 103 when the engine 107 is off. Specifically, the heat transfer system 106 is energized and run off of electricity obtained from the truck's electrical system 152. In one mode of operation, the operation of the components of the heat transfer system 106 draws a light load, such as approximately 4 to 5 amps. Therefore, the heat transfer system 106 can be continuously operated over extended periods without significantly draining the truck's batteries 154 during the required driver 10-hour rest period.

Operation of the heat transfer system 106 results in the low thermal energy stored in the cold storage device 110 to be transferred to the interior air of the cab 108, as described above, while drawing only a small amount of electricity from the truck's batteries 154. The cold storage charging system 104 normally is not run when the engine 107 is off. However, compressor 130 and fan 136, because they are electrically driven, may be run for a limited period to recharge the cold storage device 110 while the engine 107 is off, using electrical energy stored in the truck's electrical system 152, such as energy stored in the batteries 154.

In one mode of operation, the operation of the components of the heat transfer system 106 in combination with the cold storage charging system 104 draws a mid-sized load, such as approximately 25 to 30 amps. From comparisons of the amperage draws, it should be apparent to those skilled in the art that the compressor 130 of the cold charging system 104 is sized to be less than half of the capacity of the compressor 112 of the main cooling system 102, and preferably at about one quarter or less of the capacity of the main cooling system 102 compressor 112. The capacity of the compressor 130 of the cold charging system 104 can be sized at only one half of the capacity of the compressor 112 of the main cooling system 102 because, while the main cooling system is required to cool the entire cabin down, the cold charging system is used just to maintain the temperature in an already-cooled cabin. Thus, the heat transfer system 106 and/or the cold storage charging system 104 may be simultaneously run for short periods without completely draining the truck's batteries 154. By running the cold storage charging system 104 while the engine 107 is off, the maximum cooling capacity or cooling period of the cold storage device 110 may be expanded.

In a further mode of operation, with the engine 107 off and the vehicle coupled to shore power, an inverter/charger (not shown) may be used to charge the vehicle batteries, drive the electrically driven compressor 130 to charge the cold storage device 110, and/or run the heat transfer system 106 to cool the cab 108 of the truck. Thus, the illustrated vehicle cooling system 100 permits the cooling of the cab 108 and/or the thermal charging of the cold storage device 110 while the engine 107 is off, a departure from previously developed vehicle cooling systems, which require the engine to be run during cooling of the cab and thermal charging of the cold storage device.

Although the above description shows the main cooling system 102 disassociated from the cold storage device 110, it should be apparent to those skilled in the art that other configurations are within and suitable for use with the present disclosure. For instance, the main cooling system 102 may be coupled to and in heat exchange communication with the cold storage device 110. In this configuration, the main cooling system 102 may be operated to aid in cold charging the cold storage device 110 while the truck engine 107 is running, thereby decreasing the amount of time required to fully charge the cold storage device 110.

Figure 3:
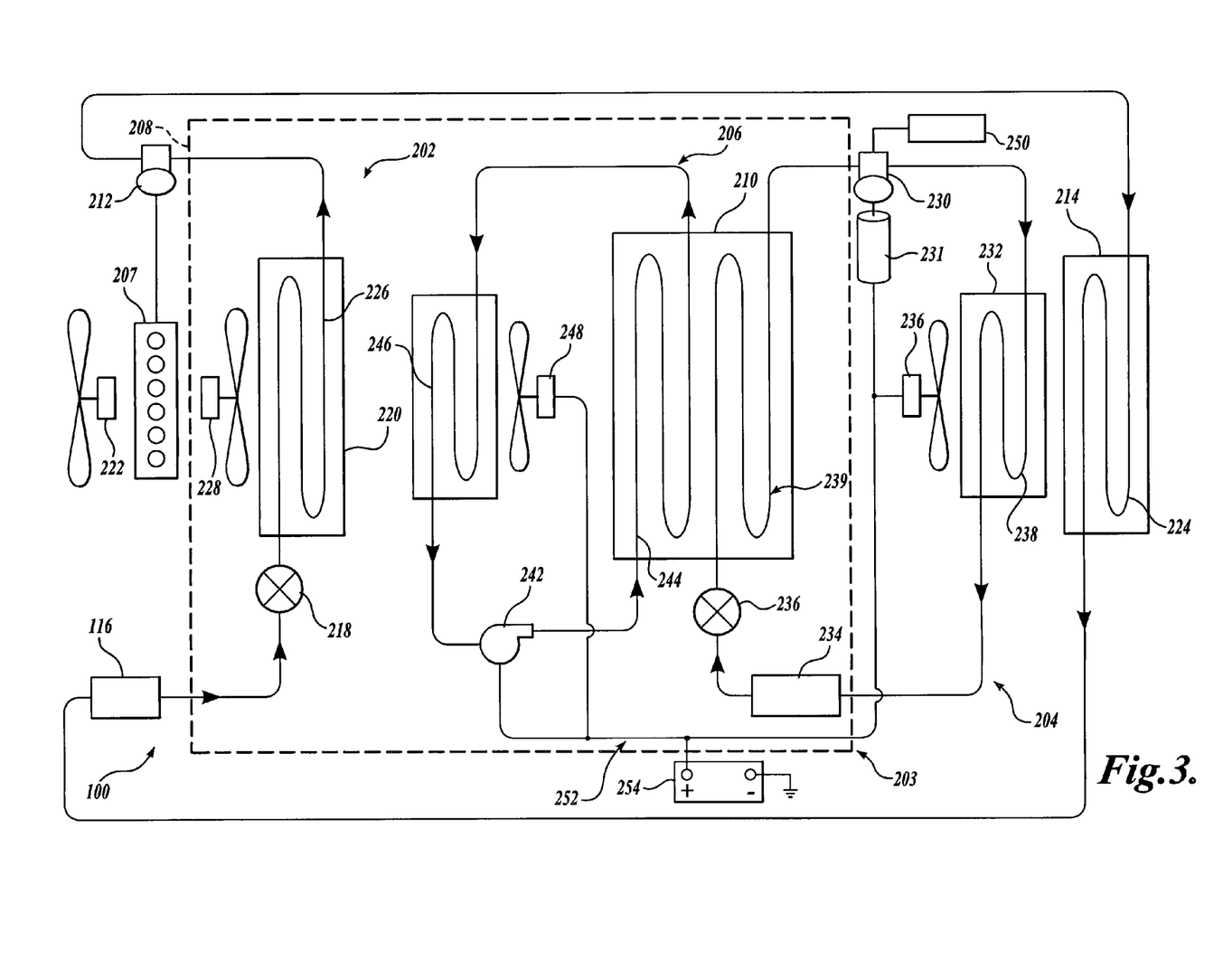
FIG. 3 is a schematic of one embodiment of a vehicle cooling system formed in accordance with the present disclosure having a main cooling system and a cold storage cooling system.

Referring to FIG. 3, one embodiment of a vehicle cooling system 200 formed in accordance with the presently claimed subject matter is disclosed. The vehicle cooling system 200 is substantially similar in structure and operation to the vehicle cooling system 100 illustrated and described above in relation to FIG. 2 with the exception that the first condenser 214 of the main cooling system 202 is in the same airflow line as, or adjacent to, the second condenser 232 of the cold storage cooling system 203. Inasmuch as the two systems 100 and 200 of FIGS. 2 and 3, respectively, are substantially similar, for the sake of brevity, this detailed description will focus generally on the aspects of the vehicle cooling system 200 which deviate from the previously described system 100 of FIG. 2.

Referring to FIG. 3, the vehicle cooling system 200 generally includes two condensers (the first condenser 214 of the main cooling system 202 and the second condenser 232 of the cold storage cooling system 203) in an associated condenser system, such that both condensers are within the same airflow line or adjacent one another. In that regard, the first and second condensers 214 and 232 may be close to one another, next to one another, adjoining one another, or at least in close enough proximity such that they are within the same airflow line for dissipating heat.

As best seen in FIG. 3 and as a non-limiting example, both the first and the second condensers 214 and 232 are in the airflow line of cooling fan 236. As discussed above with reference to cooling fan 136 of FIGS. 1 and 2, cooling fan 236 of FIG. 3 may be a low horsepower, such as a 5 horsepower, cooling fan. It should be appreciated, however, that other airflow lines not generated by a cooling fan, such as under-or around-vehicle airflow, are also within the scope of the present disclosure.

By associating the first condenser 214 of the main cooling system 202 with the second condenser 232 of the cold storage cooling system 203, the associated condenser system can use the low horsepower cooling fan 236 of the cold storage cooling system 203 to dissipate heat, thus eliminating the use of the high horsepower engine cooling fan 122 (FIG. 2) when the first condenser 214 is in use.

The benefits of associating the first condenser 214 with the second condenser 232, within the cold storage cooling system 203, include improved efficiency of the engine cooling system (because the engine cooling fan 222 cools the engine with improved efficiency, and the first condenser 214 does not preheat the air going to the engine); and reduced engine cooling fan 222 turn-on time resulting in improved fuel economy.

Figure 4:
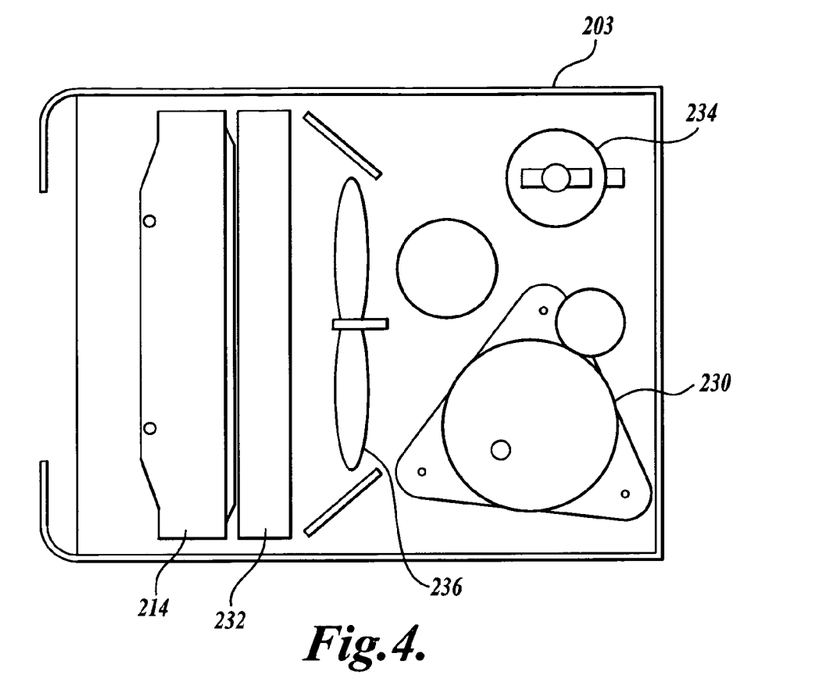
FIG. 4 is a top view of the cold storage cooling system formed in accordance with the embodiment of FIG. 3, and according to a first example.
Figure 5:
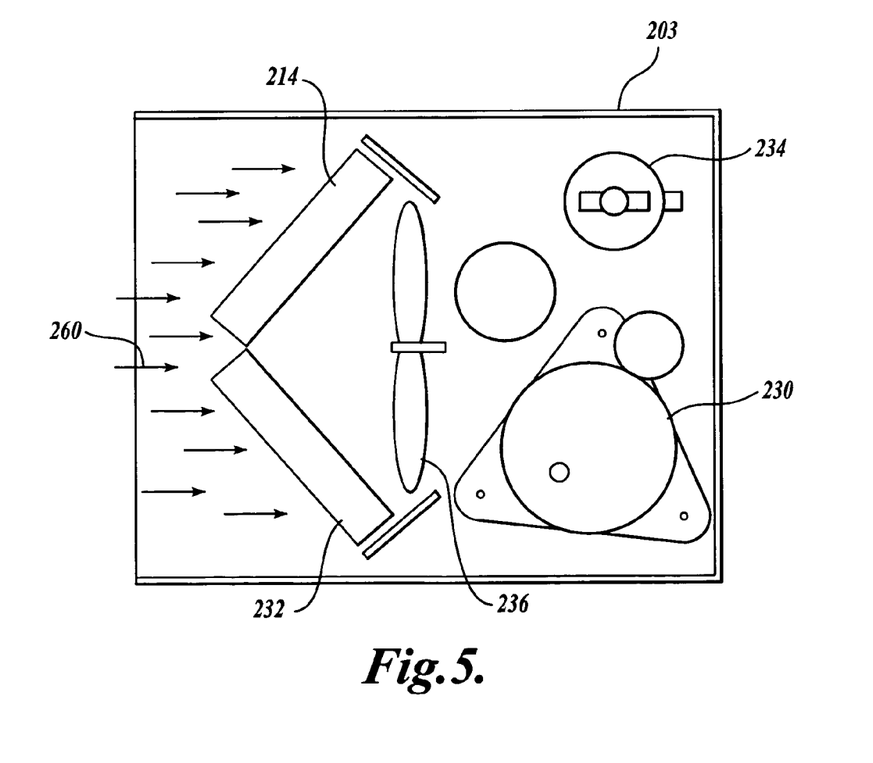
FIG. 5 is a top view of the cold storage cooling system formed in accordance with the embodiment of FIG. 3, and according to a second example.

As non-limiting examples, referring to FIGS. 4 and 5, the associated condenser system can be configured such that the first and second condensers 214 and 232 are in stacked or side-by-side configurations (see FIGS. 4 and 5), depending on space and/or cooling requirements. It should be appreciated that in the stacked or side-by-side configurations, the first and second condensers 214 and 232 are associated with one another, but still maintain separate and distinct inlets and outlets for, respectively, the main cooling system 202 and the cold storage cooling system 203.

Figure 6:
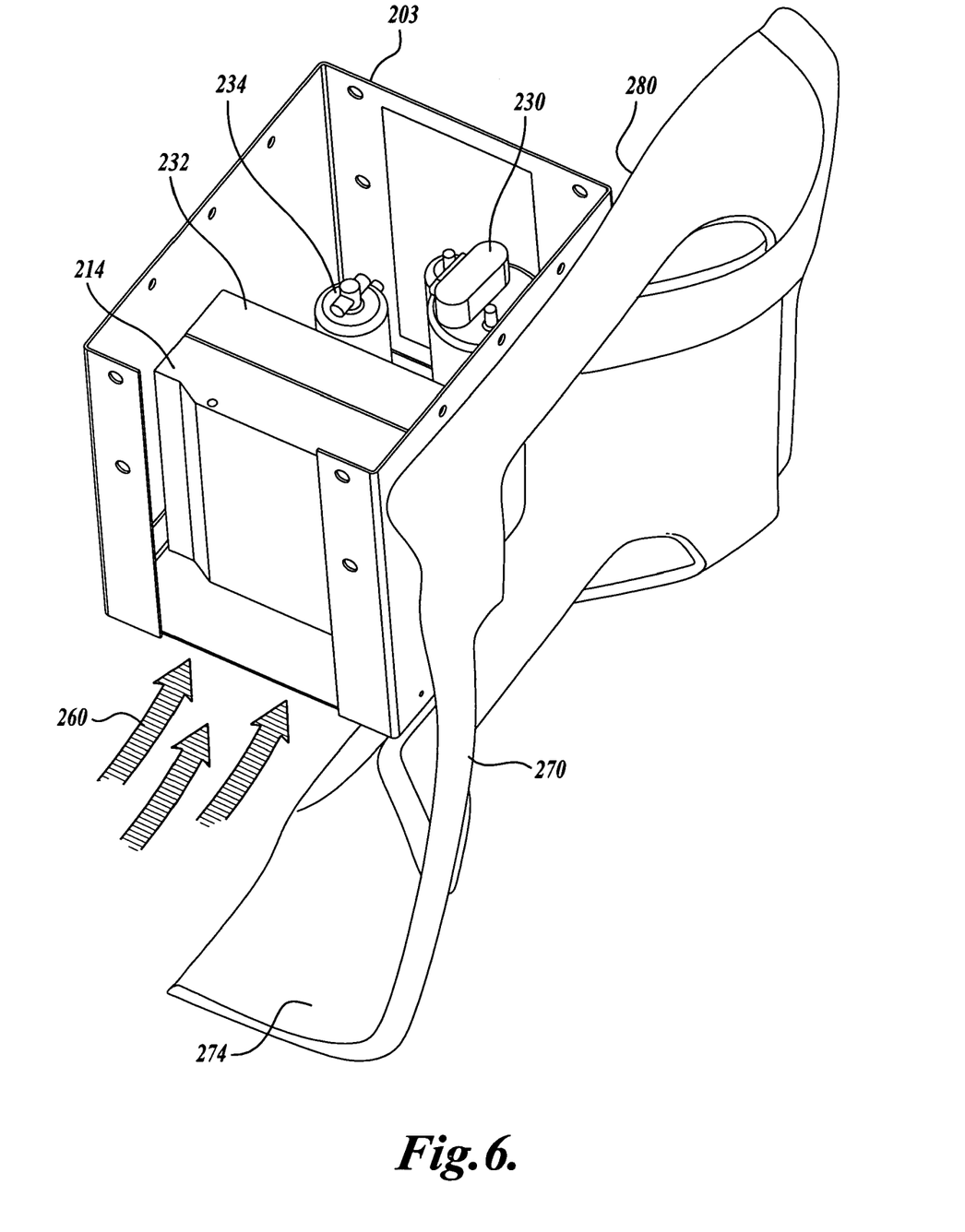
FIG. 6 is a perspective view of a cold storage cooling system formed in accordance with the embodiment of FIG. 3, and according to the first example of FIG. 4.

While the associated first and second condensers 214 and 232 may be in the same airflow line of cooling fan 236, other airflow lines are also within the scope of the present disclosure. As best seen in FIG. 6, when the vehicle is in motion, under-or around-vehicle airflow 260 also encounters the first and second condensers 214 and 232, wherein such airflow 260 drives cool air over the heat exchange coil 224 in first condenser 214 and the heat exchange coil 238 in second condenser 232 to dissipate heat.

As a non-limiting example, and as best seen in FIG. 6, both first and the second condensers 214 and 232 may be in an airflow line partially created by a fairing 270 designed and configured to direct (or redirect) under-vehicle airflow 260 toward the condensers 214 and 232 when the truck is moving. The fairing 270 includes an upper attachment portion 280 for attachment to the cold storage cooling system 203 and/or the first and second condensers 214 and 232, and a lower, inclined scoop portion 274. When the vehicle is in motion, the scoop portion 274 provides an aerodynamic guide for airflow 260 flowing under and around the vehicle.

Continuing to refer to FIG. 6, with such a fairing 270 to direct airflow to the associated first and second condensers 214 and 232, the condensers will not require additional airflow, for example, from a low horsepower cooling fan 236 (as shown in FIGS. 4 and 5), at medium to high vehicle speeds. However, airflow from the low horsepower cooling fan 236 will still likely be required at low vehicle speeds or during engine idle, when the under-or around-vehicle airflow 260 is insufficient to cool the first and second condensers 214 and 232, or when the engine is off and the second condenser 232 is in use. It should further be appreciated by those skilled in the art that other fairings to direct under-and around-vehicle airflow, designed specifically for the vehicles upon which they are attached are within the scope of the present disclosure.

Figure 7:
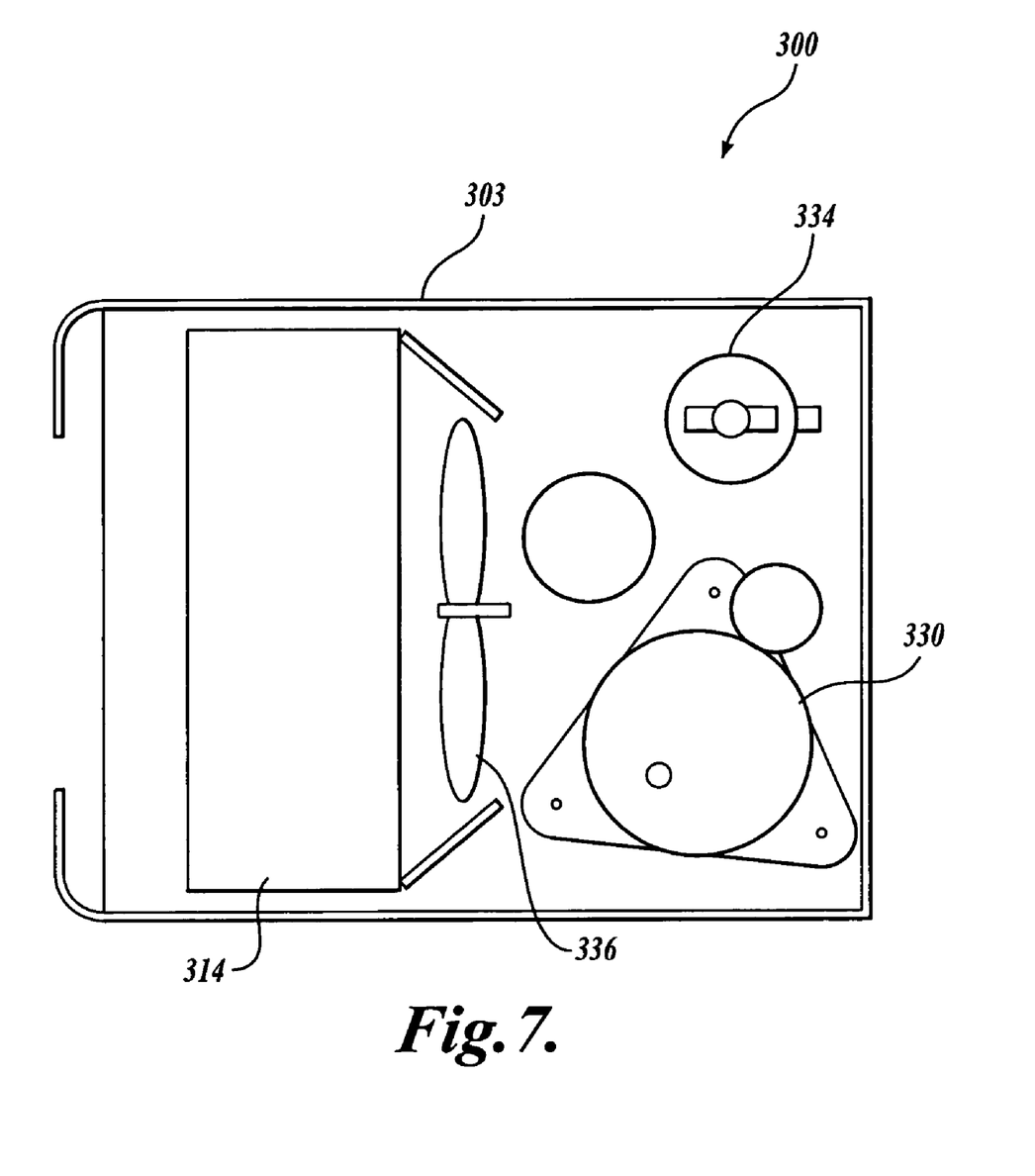
FIG. 7 is a top view of the cold storage cooling system formed in accordance with the another embodiment.

Referring to FIG. 7, an alternate embodiment of a vehicle cooling system formed in accordance with the presently claimed subject matter is disclosed. The vehicle cooling system 300 is substantially similar in structure and operation to the vehicle cooling system 200 illustrated and described above in relation to FIGS. 2-6 with the exception that the first condenser of the main cooling system is integrated with the second condenser of the cold storage system into one integrated condenser 314. When the first and second condensers are combined into a single integrated condenser 314, the integrated condenser 314 generally has the combined capacity of the two condensers that are being replaced, or at least with sufficient capacity to adequately serve both the main cooling system and the cold storage cooling system. As a non-limiting example, the integrated condenser 314 may have only one combined inlet and one combined outlet for both the main cooling system 302 and the cold storage system 303.

While illustrative embodiments have been illustrated and described, it will be appreciated that various changes can be made therein without departing from the spirit and scope of the disclosure.

The embodiments of the present disclosure in which an exclusive property or privilege is claimed are defined as follows:

1. A vehicle interior cooling system for a vehicle having a cabin and an engine for providing propulsion power, the vehicle interior cooling system comprising:
   (a) a first cabin cooling system driven by the engine of the vehicle having a first condenser;
   (b) a second cabin cooling system driven by electrical power having a cold storage device and a second condenser, the second cabin cooling system selectively thermally charging the cold storage device when the engine is in an on position and being selectable to thermally cool the cabin when the engine is in an off position and selectable to thermally cool the cabin when the engine is in the on position; and
   (c) the first condenser and the second condenser being arranged in a parallel configuration in an airflow line of under-vehicle airflow traveling substantially from the front end of the vehicle to the rear end of the vehicle when the vehicle is traveling in a substantially forward motion such that airflow flows through either of the first and second condensers but not through the other of the first and second condensers, wherein the first and second condensers are adjacent to one another in a substantially V-shaped, angular configuration such that the first and second condensers are in a diverging configuration along the airflow line.

2. The vehicle interior cooling system of claim 1, wherein the first condenser and the second condenser are combined in one integrated condenser.

3. The vehicle interior cooling system of claim 1, wherein the airflow line comes from a cooling fan associated with the second cabin cooling system.

4. The vehicle interior cooling system of claim 1, wherein the airflow line comes from redirected under-vehicle airflow when the vehicle is moving.

5. The vehicle interior cooling system of claim 1, wherein the airflow line is enhanced by a fairing associated with the second cabin cooling system and configured to redirect under-vehicle airflow.

6. A vehicle interior cooling system for a vehicle having a cabin and an engine for providing propulsion power, the vehicle interior cooling system comprising:
   (a) an engine-driven cabin cooling system having a first condenser;
   (b) an electrically-driven cabin cooling system having a cold storage device and a second condenser coupled to the vehicle, the electrically driven cooling system selectively thermally charging the cold storage device when the engine is in an on position and simultaneously selectively cooling the cabin to supplement the cabin cooling system; and
   (c) the first condenser and the second condenser being arranged in a parallel configuration in the same air flow line of under-vehicle airflow traveling substantially from the front end of the vehicle to the rear end of the vehicle when the vehicle is traveling in a substantially forward motion such that airflow flows through either of the first and second condensers but not through the other of the first and second condensers, wherein the first and second condensers are adjacent to one another in a substantially V-shaped, angular configuration such that the first and second condensers are in a diverging configuration along the airflow line.

7. A vehicle interior cooling system for a vehicle having a cabin and an engine for providing propulsion power, the vehicle interior cooling system comprising:
   (a) a first cooling system disposed within the vehicle and driven by the engine, the first cooling system having a first condenser;
   (b) a second cooling system having a cold storage device and a second condenser coupled to the vehicle, the second cooling system being selectable to thermally charge the cold storage device when the engine is in an off position and being selectable to thermally charge the cold storage device and simultaneously cool the cabin when the engine of the vehicle is in the off position, the second cooling system being thermally independent of the first cooling system; and
   (c) the first condenser and the second condenser being arranged in a parallel configuration in the same air flow line of under-vehicle airflow traveling substantially from the front end of the vehicle to the rear end of the vehicle when the vehicle is traveling in a substantially forward motion such that airflow flows through either of the first and second condensers but not through the other of the first and second condensers, wherein the first and second condensers are adjacent to one another in a substantially V-shaped, angular configuration such that the first and second condensers are in a diverging configuration along the airflow line.

8. A vehicle mounted cooling system for cooling an interior space of a vehicle, the vehicle having an engine for providing propulsion power to the vehicle, the vehicle mounted cooling system comprising:

(a) a cabin cooling system powered by the engine for cooling the interior space of the vehicle, the cabin cooling system having a first condenser;

(b) a cold storage cooling system operable independently of the cabin cooling system, the cold storage cooling system having a second condenser and a cold storage device, wherein the cold storage device is thermally chargeable and dischargeable by the cold storage system for cooling the interior space of the vehicle, the cold storage system simultaneously thermally charging the cold storage device and supplementing the cabin cooling system in cooling the interior space of the vehicle while the engine is in the on position; and (c) the first condenser and the second condenser being arranged in a parallel configuration in the same airflow line of under-vehicle airflow traveling substantially from the front end of the vehicle to the rear end of the vehicle when the vehicle is traveling in a substantially forward motion such that airflow flows through either of the first and second condensers but not through the other of the first and second condensers, wherein the first and second condensers are adjacent to one another in a substantially V-shaped, angular configuration such that the first and second condensers are in a diverging configuration along the airflow line.

* * * * *